(12) United States Patent
Cook et al.

(10) Patent No.: US 11,309,735 B1
(45) Date of Patent: Apr. 19, 2022

(54) NON-VIBRATIONAL ELECTROMAGNETIC ENERGY HARVESTER

(71) Applicant: Global Energy Applications, LLC, Bartow, FL (US)

(72) Inventors: Brian K. Cook, Bartow, FL (US); Mark M. Turner, Greenacres, FL (US)

(73) Assignee: Global Energy Applications, LLC, Bartow, FL (US)

( * ) Notice: Subject to any disclaimer, the term of this patent is extended or adjusted under 35 U.S.C. 154(b) by 0 days.

(21) Appl. No.: 17/119,438

(22) Filed: Dec. 11, 2020

(51) Int. Cl.
*H02J 50/00* (2016.01)
*H02J 50/12* (2016.01)

(52) U.S. Cl.
CPC ............ *H02J 50/001* (2020.01); *H02J 50/12* (2016.02)

(58) Field of Classification Search
CPC .................................................... H02J 50/001
USPC .......................................................... 307/104
See application file for complete search history.

(56) References Cited

U.S. PATENT DOCUMENTS

| | | | | |
|---|---|---|---|---|
| 5,402,043 A * | 3/1995 | Nilssen | ............. | H05B 41/28 |
| | | | | 315/307 |
| 6,657,528 B1 * | 12/2003 | Tang | ................. | H01F 3/14 |
| | | | | 336/134 |
| 8,174,810 B2 * | 5/2012 | Tallam | ............. | H02M 1/126 |
| | | | | 361/91.1 |
| 2015/0092455 A1 * | 4/2015 | Won | ............. | H02M 3/33507 |
| | | | | 363/21.12 |

* cited by examiner

*Primary Examiner* — Joseph Chang
(74) *Attorney, Agent, or Firm* — McHale & Slavin, P.A.

(57) ABSTRACT

An electromagnetic energy harvester circuit to obtain unrealized potential energy employs an E-I inductor having a primary coil winding and a secondary coil winding. A capacitor is electrically coupled to a main power source and upper lead to the primary coil winding, wherein a lower lead of the primary coil winding is coupled to a primary AC load. The secondary coil winding has an upper lead coupled to a first input of a secondary load and a lower lead coupled to a second input of the secondary load. The circuit harvester's electrical current produced through the windings to allow operation of the secondary load.

16 Claims, 3 Drawing Sheets

NON-VIBRATIONAL ELECTROMAGNETIC ENERGY HARVESTER

FIELD OF THE INVENTION

This invention is directed to an addition to conventional AC circuitry and, in particular, to a circuit for harvesting energy for powering a secondary load.

BACKGROUND OF THE INVENTION

Conventional electrical devices that draw an electrical load, such as AC motors and the like, require a source of power for operation; the actual load requiring a certain voltage and current draw, or electromotive force, for movement of current through a circuit. The operation of an electric motor depends upon the interaction between the motor's magnetic field and electric current in a wire winding to generate torque upon a drive shaft. For instance, older AC motors operate most efficiently with a high power factor. Increasing the power factor increases the current.

What would be beneficial to the industry is an electromagnetic energy harvester that can harvest unrealized potential energy to power a secondary load, charge batteries or be directed back to the grid without affecting the operational characteristics of a primary load. The circuit allows a method of tuning wherein a secondary coil winding of an E-I inductor generates a voltage and current independent of the primary coil. Resistance across secondary coil leads regulates voltage and current. Secondary coil windings can be added or removed to regulate current and voltage of the secondary coil winding. Adding resistance across secondary coil leads increases voltage and decreased current. Lowering resistance across secondary coil leads increases current and decreases voltage.

SUMMARY OF THE INVENTION

An electromagnetic energy harvester circuit formed from a laminated E-I inductor. The E base has no magnetic attraction to the I base. A formed center leg receives an upper primary coil winding and a lower secondary coil winding. The upper primary coil winding is energized from a main source with the inductor providing a primary flux to the upper primary coil winding and a secondary flux to the lower primary coil winding.

A capacitor is electrically coupled to the main power source and an upper lead to the primary coil winding to form the primary flux. A lower lead of the primary coil winding is electrical coupled to a primary AC load. The secondary coil winding forms a secondary flux having an upper lead coupled to a first input of a secondary load and a lower lead coupled to a second input of the secondary load. The circuit draws electrical current produced through the windings to power to a secondary load.

An objective of the invention is to harvest potential energy directed to a primary load for providing energy to a secondary load.

Another objective of the invention is to teach the use of an E-I laminated inductor that has no magnetic attraction between the E laminate and the I laminate.

Still another objective of the invention is to teach a method of tuning circuitry for harvesting unrealized potential energy, which depends upon the relative position of various parts of a system, wherein resistance added to a secondary coil winding of an E-I inductor increases voltage and decreases current.

Still another objective of the invention is to teach a method of tuning the harvester circuitry wherein removal of secondary coil windings and increasing secondary coil winding resistance across its leads increases voltage and current.

Other objectives, advantages and benefits associated with this invention will be apparent to those skilled in the art from the description, examples and the claims which follow.

DETAILED DESCRIPTION OF THE PREFERRED EMBODIMENT

Figure 1:
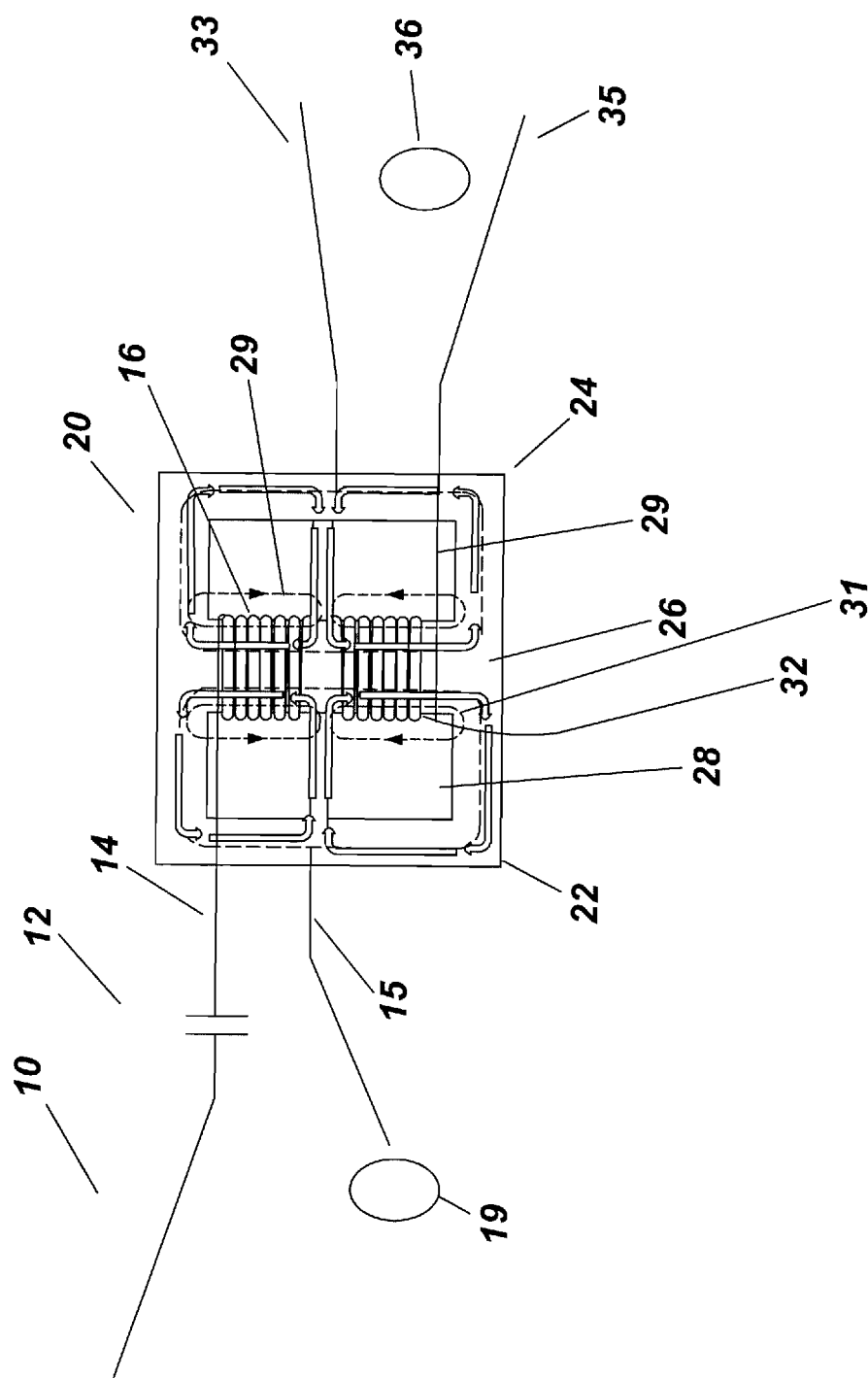
FIG. 1 is an electrical schematic of the harvester of the instant invention.

A detailed embodiment of the instant invention is disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring to the Figures, the main power feed 10 is coupled to a capacitor 12 in series with a lead line 14 to a primary coil winding 16 of an E-I laminations shell type core inductor 20. The inductor 20 is constructed from electrical steel base laminations stamped out of an E base 40 having outer legs 22, 24 laminations and center leg 26 coupled to an I base lamination 42 which forms winding windows 28, 29. In a preferred embodiment, the center leg 26 is about twice the width of the outer legs 22 or 24, wherein magnetic flux flowing out of the center leg 26 divides equally. The stack of laminations has a core of a rectangular cross section with primary windings 16 placed over an upper section 30 of the center leg 26 with a lead line 15 for coupling to a primary load 19 and a secondary coil winding 32 placed over a lower section 37 of the center leg 26. In a preferred embodiment, the center leg 26 is rectangular shaped with winding wire that conforms to the shape of the leg. A round center leg may be employed to minimize winding resistance, and the use of various sized winding wires is considered within the scope of this invention.

The capacitor 12 is used to increase the power factor for a primary load, such as an AC motor, that is being powered. The power factor is defined as the ratio of power absorbed by the load to the apparent power flowing in the circuit. The capacitor 12 improves the power factor by giving it the means to produce a certain proportion of the reactive energy it consumes itself. PF−kW/kVA=cosine Ø kVA.

As the power factor increases, apparent voltage increases in the circuit causing increased current leading to a small increase in primary line 10 draw from the mains. The secondary coil winding 32 placed in the iron core of the device is similar to that of a transformer setup, but starts with the same number of coil windings and wire gauge size as the primary coil winding 16.

The two windings 16, 32 employed in the inductor 20 serve different purposes. In this arrangement, the use of matched windings results in the secondary winding 32 generating a magnetic field flux 31 equal to a magnetic field flux 29 from the primary winding 16. When equal flux is generated by both windings 16, 32 placed within the iron core [ferrous metal], the magnetic field flux lines 29, 31 move in opposite directions per each coil winding, causing a complete flux circle around each coil winding. The opposite rotating magnetic field flux lines within the iron core cancel each other, giving the appearance that the iron core has no magnetic flux. The secondary load 36 employs the excess energy from the inductor 20 provided by lead lines 33 and 35 coupled directly to the secondary load.

With a fully shorted secondary winding 32, the winding will produce the same amperage as the primary winding 16, which is based on what the load is calling for. For example, 2 amps on a primary load and the secondary load will have 2 amps, but almost no volts.

By adding capacitance to the circuit to increase the power factor, the apparent voltage will rise in the circuit, increasing draw. With no magnetic field within the iron core, all voltage and current will pass the primary coil winding without interruption. By adding resistance to the secondary coil winding leads, the voltage in the secondary coil winding starts to rise. As voltage goes up, the magnetic field within the secondary coil winding starts to get weaker.

As the magnetic field weakens on the secondary windings 32, the primary windings 16 will be affected and primary voltage and current will start to go down in the primary windings while voltage goes up in the secondary winding. The potential energy arises in systems with parts that exert forces on each other of a magnitude dependent on the configuration, or relative position, of the parts. Potential energy is a property of a system and not of an individual body or particle.

In one embodiment, the distance V1 of the windings of the primary coil winding 16 and the distance V2 of the windings of the secondary coil winding 32 are equal. By way of tuning, the primary coil windings 16 may have up to about 25% more windings than the secondary coil windings 32. For instance, the primary coil winding 16 may have one hundred windings when the secondary coil winding 32 has seventy-five windings. Depending on the loading, the adjustment of the secondary windings 32 allow the circuit to be "tuned" accordingly. The inductor 20 stores energy in the electromagnetic field created by the current. Commonly referred to as a coil winding or choke, the inductor 20 blocks any changes in current flowing through it. The inductance of an inductor is dependent on multiple factors, including the number of turns of a winding, the spacing between the turns, the number of layers of turns, the core material, magnetic permeability, size, shape (square vs. round) and so forth. The inductance of the inductor 20 employed in accordance with the invention depends upon the primary and secondary loads employed wherein the inductor can be tuned to the loads.

Voltage and current start to decrease on the primary coil winding 16 while power factor remains constant. The tuning process brings the voltage and current back to OEM specs for the primary load while adding small amounts of resistance to secondary coil winding leads, voltage increases and current starts to decrease. Removing coil windings from the secondary coil winding 32 helps in the tuning process by increasing the secondary coil winding amperage output while maintaining voltage output.

Removing secondary coil windings 32 a few at a time and increasing secondary coil winding resistance across its leads tunes secondary coil winding voltage and causes current output to go up. Apparent voltage and current decrease at the load until desired voltage and current are obtained. This process of using two coils within an iron core allows the primary coil winding to generate a magnetic flux based on current demand from a primary load, such as an AC motor. The magnetic flux developed within the iron core from the two coil winding is oppositional. The primary coil winding has current supplied due to the load which causes current and magnetic field within the secondary coil winding having a field rotation that is of opposite direction to the primary coil produced magnetic field, essentially causes the secondary coil winding to develop a generator affect.

In one embodiment the primary coil winding produces a magnetic field that rotates alternately in a counter-clockwise and clockwise direction, and the secondary coil winding produces a magnetic field flux line that rotates in a counter-clockwise and clockwise direction. In an alternative embodiment the primary coil winding produces a magnetic field flux line in a counter-clockwise direction, and the secondary coil winding produces a magnetic field in a clockwise direction.

Figure 2:
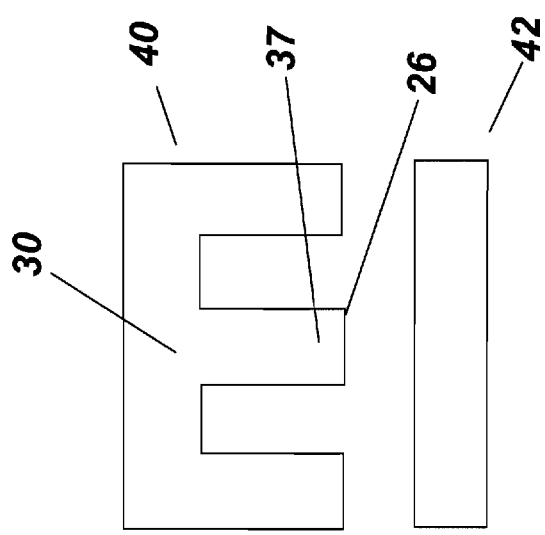
FIG. 2 is a pictorial view of an E and I lamination, emphasizing the lack of magnetic attraction between laminates.
Figure 3:
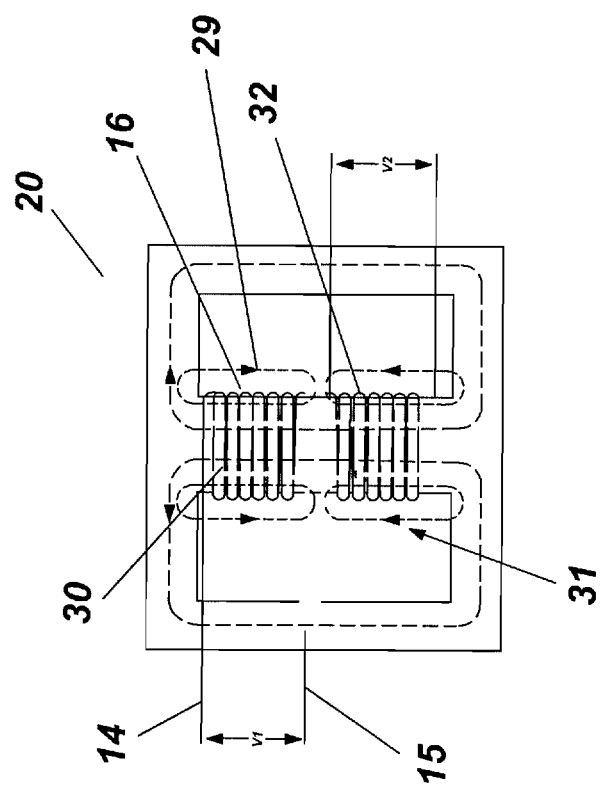
FIG. 3 is pictorial view of the E-I inductor.

FIG. 2 depicts an exploded view of the inductor 20 having an E lamination 40 separated from an I lamination 42, emphasizing that there is no magnetic attraction between laminates. FIG. 3 is an enlarged view of the inductor 20, illustrating an embodiment of the E-I inductor having a primary flux 29 and secondary flux 31, wherein the secondary windings 32 total about seventy-five and the primary windings 16 total about one hundred, a 25% increase in windings.

The preferred embodiment employs an E-I core providing two open sides which allows substantial room to bring high current lead wires out from the coil, and assures no magnetic attraction between the laminated. It should be noted that an E-E combination may also be used.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Furthermore, a device or structure that is configured in a certain way is configured in at least that way, but may also be configured in ways that are not listed.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An electromagnetic circuit for harvesting energy to power a secondary load comprising:
   an E-I inductor having an E laminate and an I laminate defining a center leg spaced apart from two outer legs;
   a primary coil winding having an upper lead winding around a top portion of said center leg with a primary coil winding outlet, said primary coil winding forming magnetic field flux lines that rotate alternately in a clockwise direction and counter-clockwise direction;
   a capacitor electrically coupled to a main power source and said primary coil winding upper lead, wherein a lower lead of said primary coil winding is coupled to a primary AC load;
   a secondary coil winding having an upper lead coupled to a first input of a secondary load and a lower lead coupled to a second input of the secondary load, said secondary coil winding forming a magnetic field flux lines that rotate in a counter-clockwise and clockwise direction.

2. The electromagnetic circuit according to claim 1 wherein said inductor is formed of a shell type core.

3. The electromagnetic circuit according to claim 1 wherein no magnetic attraction exists between the E laminate and the I laminate.

4. The electromagnetic circuit according to claim 1 wherein said primary coil winding and said secondary coil winding are equal.

5. The electromagnetic circuit according to claim 1 wherein resistance added to said secondary coil winding increases voltage and decreases current.

6. The electromagnetic circuit according to claim 1 wherein lowering resistance across secondary coil winding increases current and decreases voltage.

7. The electromagnetic circuit according to claim 1 wherein removal of secondary coil windings increases current.

8. The electromagnetic circuit according to claim 1 wherein said primary coil winding has about 25% more windings than said secondary coil winding.

9. The electromagnetic circuit according to claim 8 wherein said primary coil winding is about one hundred (100) windings and said secondary coil winding is about seventy-five (75) windings.

10. An electromagnetic circuit comprising:
    an E-I inductor having an E laminate and an I laminate defining a center leg spaced apart from two outer legs, wherein no magnetic attraction exists between the E laminate and the I laminate;
    a primary coil winding having an upper lead winding around a top portion of said center leg with a primary coil winding outlet, said primary coil winding forming magnetic field flux lines that rotate alternately in a clockwise direction and counter-clockwise direction;
    a capacitor electrically coupled to a main power source and said primary coil winding upper lead, wherein a lower lead of said primary coil winding is coupled to a primary AC load;
    a secondary coil winding having an upper lead coupled to a first input of a secondary load and a lower lead coupled to a second input of the secondary load, said secondary coil winding forming a magnetic field flux lines that rotate in a counter-clockwise and clockwise direction;
    wherein the electromagnetic circuit is constructed and arranged to harvest magnetic field energy caused by the flow of alternating electrical current through a conductor to power a secondary load with an electromotive force, or be directed back to a grid without affecting operational characteristics of a primary load.

11. The electromagnetic circuit according to claim 10 wherein said inductor is formed of a shell type core.

12. The electromagnetic circuit according to claim 10 wherein said secondary coil can be tuned to adjust voltage and current.

13. The electromagnetic circuit according to claim 10 wherein said primary coil winding has more windings than said secondary coil winding.

14. The electromagnetic circuit according to claim 10 wherein resistance added to said secondary coil winding increases voltage and decreases current.

15. The electromagnetic circuit according to claim 10 wherein lowering resistance across secondary coil winding increases current and decreases voltage.

16. The electromagnetic circuit according to claim 10 wherein removal of secondary coil windings increases current.

* * * * *